Dec. 16, 1930.                G. CHRISTENSON                1,784,926
                              SWIVEL JOINT PACKING
                              Filed July 25, 1927

Inventor
George Christenson
by Roberts Cushman + Woodbury
Att'ys.

Patented Dec. 16, 1930

1,784,926

UNITED STATES PATENT OFFICE

GEORGE CHRISTENSON, OF NORTH PLAINFIELD, NEW JERSEY, ASSIGNOR TO JOHNS-MANVILLE CORPORATION, OF NEW YORK, N. Y., A CORPORATION OF NEW YORK

SWIVEL-JOINT PACKING

Application filed July 25, 1927. Serial No. 208,072.

The present invention relates to a packing construction more particularly adapted for use in a universal or swivel joint in steam lines or the like, for example, in a joint of the ball and socket type.

In various mechanical constructions involving a flexible connection between two sections of a fluid conduit it is necessary to provide a packing which will prevent escape of the fluid under pressure and which will be adapted to withstand frictional wear for a long period of time without replacement, while being substantially free from such wear when not required for sealing the coupling connection. For example, in such equipment as "booster" engines, which may be attached to locomotive tenders or the like and which are used occasionally to supplement the tractive power of the locomotive in starting or upon upgrades, it is desirable to provide a flexible stream connection between the "booster" engine and the locomotive boiler.

The present invention provides a packing of this character which is designed more effectively to provide a fluid-tight seal and to endure adverse service conditions.

Further objects and advantages of the invention will be apparent to those skilled in the art upon a reading of the subjoined description and claims in conjunction with the accompanying drawings, wherein:

Figure 1:
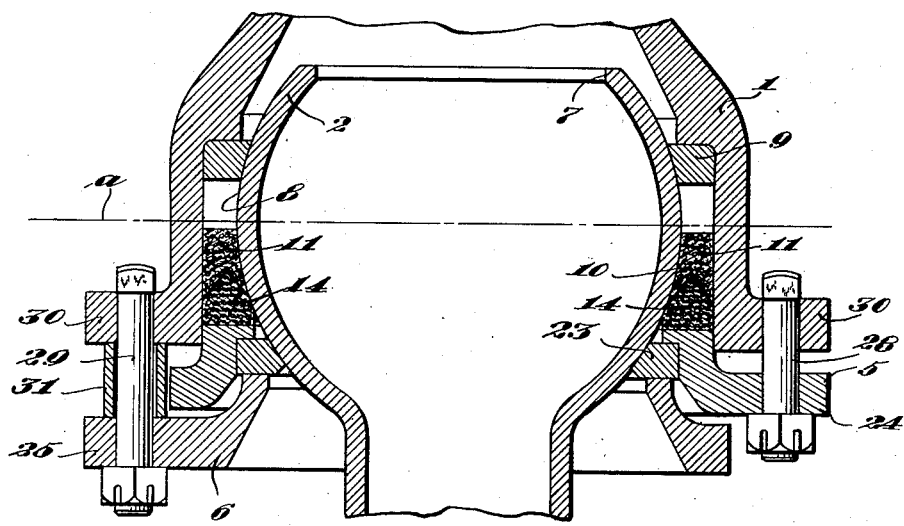
Fig. 1 is a central-sectional view through the improved form of joint construction.
Figure 2:
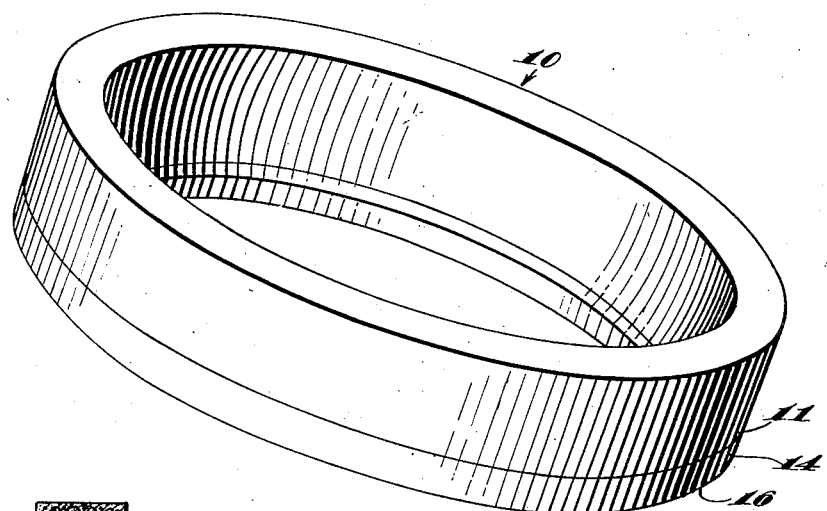
Fig. 2 is a perspective view of the improved form of packing ring.
Figure 3:
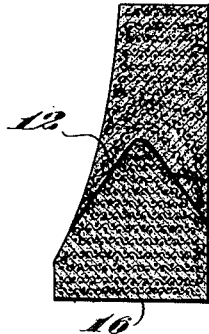
Fig. 3 is an enlarged cross section of the same.

The type of packing disclosed herein is particularly adapted for use in conjunction with universal or swivel joints in high pressure fluid conduits, such as high pressure steam lines, and especially with ball and socket joints. Fig. 1 discloses such a joint comprising the socket 1 which receives the hollow ball 2. The latter is provided with a fluid outlet 7 opening into the socket member and is engaged by an adjoining metallic bearing ring 9 which is located within socket member 1, while a second bearing ring 23 also engages the spherical surface 8 of member 2 being held in place by the packing gland 6.

Disposed between rings 9 and 23 is the packing 10 which is composed of a pair of complementary packing rings, which may be formed of any suitable material that preferably is somewhat resilient or yieldable and that is form sustaining under normal conditions, such, for example, as impregnated asbestos fabric. This packing is shaped or formed in any desired manner to receive the particular dimensions and contours which will now be specifically described.

Packing 10 comprises a ring portion 11 which is provided with an annular groove 12 with convergent sides, preferably being of V-shaped cross-section, and the inner face of which has a concave curvature to fit the spherical surface 8 of member 2. The complementarily shaped packing member 14 is provided with an annular ridge 15 which is adapted to engage within the groove 12. The member 10 is so shaped and disposed that it fits between socket 1 and ball 2 in a region at one side of a plane passing through the center of ball 2, such a plane being designated by the dot and dash lines a, Fig. 1.

Preferably packing 14 has also a surface curved to engage the ball 2, as well as an annular face 16 resting upon an abutting face of the packing gland 5 adjoining gland member 6 that engages bearing ring 23. Upon the outer edges of glands 5 and 6 are the radial flanges 24 and 25 respectively having openings therein to receive fastening members 28 and 29, the latter being provided with spacing sleeves 31. These fastenings pass through a flange 30 carried by socket member 1 and hold the gland rings firmly in place.

It is evident that when fluid under pressure passes through a conduit in which the improved form of coupling is disposed, fluid leakage may tend to occur between the hemispherical surface 8 and the bearing ring 9. This fluid pressure will force the ring 11 downwardly upon the ring 14 forcing outwardly the portions of ring 11 which define groove 12, thus effecting a wedge-like engagement of these packing portions between the upstanding rib 15 and the adjoining portions of the ball and socket respectively. Thus the fluid pressure tends to augment the tightness with which the packing engages the metal walls in order to provide a fluid-tight seal, while normally there may be but little friction between these parts; the novel shape and arrangement of the packing rings affording a simple and effective fluid seal, when necessary.

I claim:

1. A universal joint pipe coupling construction comprising relatively movable ball and socket members, bearing rings between the ball and socket members, and packing between the rings, said packing comprising yieldable rings, said packing rings having an interfitting V-shaped groove and recess with the sides thereof inclined in relation to the general plane of each of the rings, a gland member holding one of the packing rings in place, said packing rings being disposed entirely at one side of a plane passing through the center of the ball, said packing and bearing rings being arranged to afford a fluid space between the ball and socket upon the side of the packing remote from the gland, whereby fluid pressure due to leakage into said space tends to cause the packing rings to be pressed into more intimate engagement with each other and the walls of the ball and socket members.

2. A universal joint pipe coupling construction comprising relatively movable ball and socket members, bearing rings between the ball and socket members, and packing between the rings, said packing comprising yieldable rings with engaged annular surfaces inclined in relation to the general plane of each of the rings, a gland member holding one of the packing rings in place, said packing rings being disposed entirely at one side of a plane passing through the center of the ball, said packing and bearing rings being arranged to afford a fluid space between the ball and socket upon the side of the packing remote from the gland, whereby fluid pressure due to leakage into said space tends to cause the packing rings to be pressed into more intimate engagement with each other and the walls of the ball and socket members.

Signed by me at Manville, N. J., this 22nd day of July, 1927.

GEORGE CHRISTENSON.